United States Patent [19]

Evans

[11] Patent Number: 4,656,456

[45] Date of Patent: Apr. 7, 1987

[54] JOYSTICK CONTROL CIRCUIT

[75] Inventor: Steven K. Evans, Mercer County, N.J.

[73] Assignee: RCA Corporation, Princeton, N.J.

[21] Appl. No.: 775,024

[22] Filed: Sep. 11, 1985

[51] Int. Cl.⁴ .......................................... H01C 10/16
[52] U.S. Cl. .................................................. 338/128
[58] Field of Search ............... 338/128; 200/6 R, 6 A; 174/471 XY

[56] References Cited

U.S. PATENT DOCUMENTS

| | | | |
|---|---|---|---|
| 3,770,915 | 11/1973 | Bennett et al. | 200/6 A |
| 4,095,123 | 6/1978 | Takahashi | 200/6 A |
| 4,161,726 | 7/1979 | Burson et al. | 200/6 A |
| 4,375,631 | 3/1983 | Goldberg | 338/128 |
| 4,390,877 | 6/1983 | Curran | 200/6 A |

Primary Examiner—E. A. Goldberg
Assistant Examiner—M. M. Lateef
Attorney, Agent, or Firm—Joseph S. Tripoli

[57] ABSTRACT

A control circuit for a joystick includes two dual input NAND gates having one of their inputs connected in common. A potentiometer has a wiper connected to the common NAND gate inputs and has two end terminals each connected to the output of a different NAND gate. A capacitor couples the wiper to ground potential. The control circuit produces a pulsed output signal from one NAND gate when the wiper is moved in one direction from a central position and a pulsed output from the other NAND gate when the wiper is moved in the other direction. The frequency of each NAND output signal varies in relation to the distance that the wiper is moved from the central position.

5 Claims, 2 Drawing Figures

JOYSTICK CONTROL CIRCUIT

The present invention relates to circuits for emitting electrical signals in response to the position of a joystick.

BACKGROUND OF THE INVENTION

Joysticks are conventionally utilized to provide positioning information in a single or a two-dimensional system. For example, joysticks are commonly used to position objects on the screen of a video game or to manipulate a machining tool about a two-dimensional work surface.

The typical joystick such as that shown in U.S. Pat. No. 4,375,631, issued on Mar. 1, 1983, to Thomas R. Goldberg, consists of two potentiometers coupled to a control handle. As the handle is pivoted about two orthogonal axes, the resistance of the potentiometers vary in relation to the position of the handle. The value of the resistance or the magnitude of the current passing through the potentiometer indicates the position of the joystick handle about the corresponding axis. This resistance, or current, representing the handle's position is then utilized to control some other function such as the position of the video game object or the machine tool head. The movement of the handle may be used to dynamically control the object by a circuit which continuously monitors the change in the potentiometer resistance and employs the monitored resistance to move the object in a pattern corresponding to the movement of the joystick handle.

In an alternative joystick embodiment, the movement of the handle produces a pulsed electrical signal in which the frequency of the pulses represents the position of the handle along one orthogonal axis. The benefit of this latter type of joystick is that the signal produced by the movement of the handle is digital in nature and can readily be handled by digital computer circuits, as opposed to a conventional potentiometer based device producing an analog output signal which has to be digitized for processing. The present invention employs this latter or digital approach.

SUMMARY OF THE INVENTION

A control circuit comprises two dual input logic gates. A first potentiometer has two end terminals, each of which is connected to an output of one of the logic gates, and a wiper, which is connected to one input of each of the logic gates. A capacitor also couples the wiper of the potentiometer to a first electrical potential.

Additional circuitry is provided for selectively applying a second electrical potential to the other input terminal of one of the first and second logic gates when the wiper of the potentiometer moves from a neutral position in its travel toward the first or second end terminal, respectively. When the second electrical potential is applied to the respective logic gate, it produces a pulsed electrical signal having a frequency controlled by the RC time constant of the potentiometer and the capacitor. The frequency of the pulsed output signal varies as the position of the potentiometer changes.

DETAILED DESCRIPTION OF THE PREFERRED EMBODIMENTS

Figure 1:
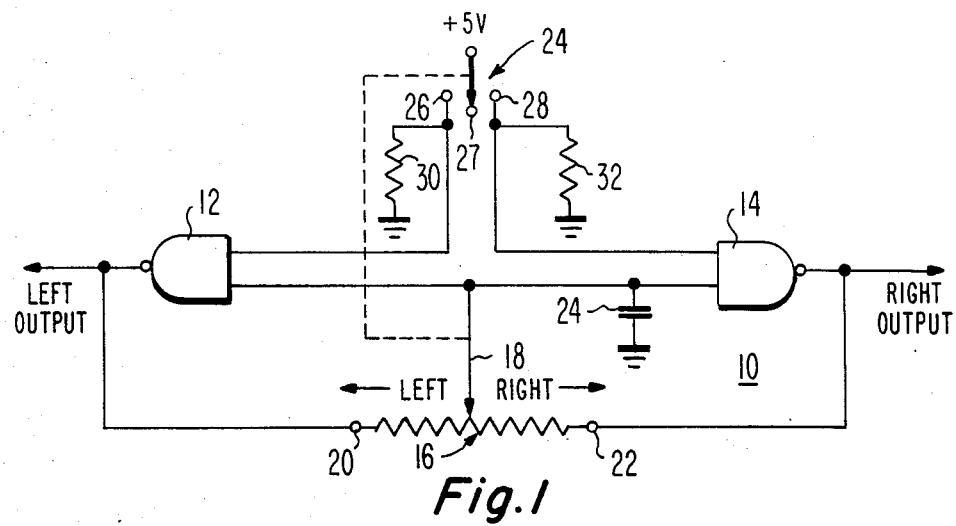
FIG. 1 is a schematic diagram of one embodiment of the circuit according to the present invention.

As shown in FIG. 1, a control circuit 10 for a joystick or similar position control device, comprises first and second dual input NAND gates 12 and 14, respectively, having one input of each connected in common. Although the invention is described in terms of a circuit employing NAND gates, one of ordinary skill in the art could design a circuit using other types of logic gates. A potentiometer 16 has a wiper 18 coupled to the commonly connected inputs of the first and second NAND gates. The potentiometer has a first end terminal 20 coupled to the output of the first NAND gate 12 and a second end terminal 22 coupled to the output of the other NAND gate 14. A capacitor 24 couples the wiper of the potentiometer 16 to ground potential.

A single pole-triple throw switch 24 has a wiper contact connected to a positive voltage source (e.g. +5 volts) and is wired with the center position as an off position. Specifically a first end switch terminal 26 is connected to the other input of the first NAND gate 12, the second end switch terminal 28 is connected to the other input of the second NAND gate 14 and the center switch terminal 27 is left unconnected. Two pull down resistors 30 and 32 couple the end switch terminals 26 and 28, respectively, to ground potential. The wiper of the switch 24 and the wiper 18 of potentiometer 16 are mechanically ganged together and may be connected to the handle of a joystick (not shown).

The circuit as shown in FIG. 1 provides two output pulses indicating the movement of the joystick handle along one axis, for descriptive purposes the axis will be assumed to run from left to right with respect to the position of the operator. When the joystick is in the center or neutral position, the wiper 18 of the potentiometer 16 is approximately centered along its length of travel and the wiper of switch 24 is connected to the center or off terminal 27. In the neutral position, the two pull down resistors 30 and 32 produce a low logic level at the corresponding inputs of the NAND gates 12 and 14. This causes the output of both NAND gates to be high regardless of the level of the signal at the common input which is connected to wiper 18. Therefore, in the neutral position the outputs from both of the NAND gates 12 and 14 will be high.

As the joystick handle is moved either left or right, the wiper 18 of the potentiometer moves correspondingly left or right along the resistance and the wiper of switch 24 moves to one of the two end terminals 26 or 28 corresponding to the direction of the movement. For example, if the joystiok handle is moved to the right, the wiper of the switch 24 will switch to the second end terminal 28 providing a positive voltage at the non-common input of the second NAND gate 14. At this point both of the inputs to the second NAND gate 14 are high which produces a low output.

The output is fed back to the first input through an RC network consisting of potentiometer 16 and capacitor 24. The time constant of the RC network is such that the common input of second NAND gate 14 will go low after a short time interval following the output of the second NAND gate going low. At this point in time one input to the second NAND gate 14 is high and one is low producing a high output which will be fed back through the RC network driving the common input high after the RC time constant delay. The feedback circuit through resistor 16 places NAND gate 14 in an astable state, producing a switching of its output between high and low levels. In this state the output of the second NAND gate takes the form of a pulse train having a period (and frequency) determined by the RC time constant of potentiometer 16 and capacitor 24. When the joystick is moved toward the right, the potential at the first end terminal 26 of switch 24 remains at ground potential being pulled down by resistor 30. Therefore, the left output signal provided by the first NAND gate 12 will not change states, remaining at a constant high logic level.

If the joystick handle is moved farther to the right, the resistance in the feedback loop will decrease, shortening the time delay in the feedback loop and producing a higher frequency pulse train output from the second NAND gate 14. Therefore, the frequency of the output from the second NAND gate 14 indicates the position of the joystick handle to the right of the neutral position.

As the wiper of potentiometer 16 is returned from a right-hand position to the neutral position, the frequency of the right output signal will decrease. When the handle is placed in the neutral position, the switch 24 will return to the center off position clamping the corresponding input of the second NAND gate 14 to ground potential through the second resistor 32. This grounding of the one input of NAND gate 14 drives the output to a constant high logic level stopping the oscillation of the right output signal.

Similarly, if the joystick handle is moved to the left, switch 24 will connect the positive potential to the first end terminal 26 and the corresponding input to the first NAND gate 12. As with the operation of the second NAND gate 14 described above, this will produce a pulse train at the output of the first NAND gate 12 having a frequency which corresponds to the position of the handle in the left direction. As the handle is moved to the left, the output of the second NAND gate 14 remains high.

The outputs from the two NAND gates 12 and 14 may be fed to a computer or other digital circuitry for decoding to produce an indication as to the position of the joystick. Specifically, the position of the joystick handle may be determined by counting the number of pulses that occur on both the left and the right output lines during some fixed time interval.

Figure 2:
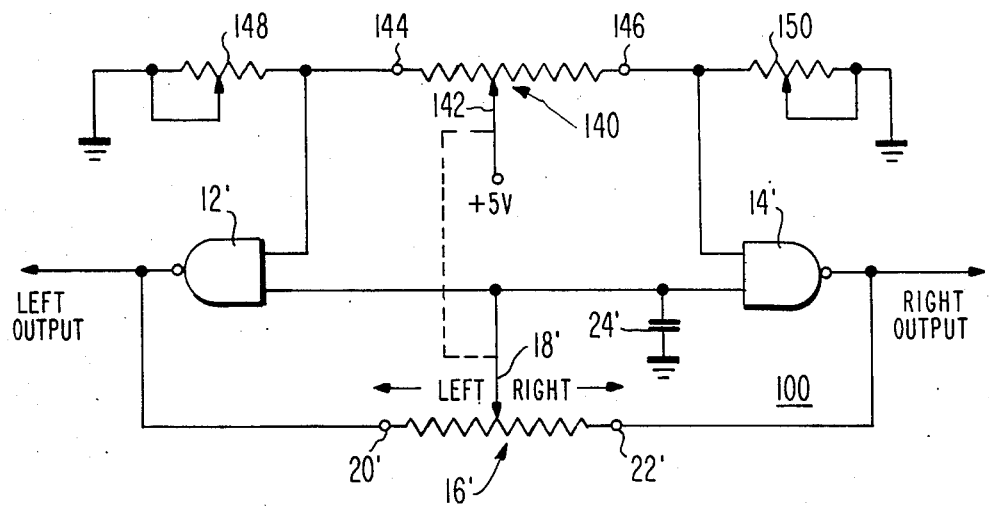
FIG. 2 is a schematic diagram of an alternative embodiment of the present invention.

An alternative embodiment which may be easier to implement is shown in FIG. 2. The circuit 100 is very similar to that in FIG. 1 except that the switch 24 and resistors 30 and 32 have been eliminated and the non-common terminals of the first and second NAND gates 12 and 14 are coupled to a voltage divider circuit. In FIG. 2 the components which are identical to those of FIG. 1 have been given the same numerical designation with the addition of a prime symbol. The circuit as shown in FIG. 2 further comprises a second potentiometer 140 having a wiper 142 connected to a positive voltage source and mechanically connected to the wiper 18' of the first potentiometer 16'. The joystick handle (not shown) may be coupled to the two wipers. A first end terminal 144 of potentiometer 140 is connected to the non-common input of the first NAND gate 12'. A first variable resistor 148 couples the first end terminal 144 to ground potential. The second end terminal 146 is connected to the non-common input of the second NAND gate 14' and to ground potential through a second variable resistor 150.

Prior to using control circuit 100 in FIG. 2, the two variable resistors 148 and 150 must be properly adjusted so that when the joystick is in the neutral position the voltage at the non-common inputs of the first and second NAND gates 12' and 14' are just slightly below the turn-on voltage for the NAND gates. Once the variable resistors 148 and 150 have been properly adjusted, they may be replaced by fixed resistors of equal resistance. In the neutral position the non-common NAND gate inputs are at low logic levels and the output of both of the NAND gates will be at a high level regardless of the logic level (voltage) at the commonly connected inputs.

Then if the joystick handle is moved to the right, the wiper of the second potentiometer 140 will decrease the resistance between the positive voltage supply and the second end terminal 146 producing a high logic level at the non-common input of the second NAND gate 14'. This high logic level places the second NAND gate in an astable configuration such that it will produce an output signal which will oscillate between high and low logic levels at a frequency determined by the RC time constant of the first potentiometer 16' and the capacitor 24'. As the joystick handle moves farther to the right, the resistance in the feedback loop of the second NAND gate 14' will decrease, increasing the frequency of the output pulses.

It is noted that during the time in which the second NAND gate 14' is in an astable configuration the level of the signal applied to the non-common input of the first NAND gate 12' is at a low logic level since the resistance between the positive voltage source and the first end terminal 144 of the second potentiometer 140 has increased.

Similarly, if the joystick handle is moved to the left, the first NAND gate 12' will be placed in the astable configuration and the second NAND gate 14' will produce a constant high output.

Although the embodiments of the present invention shown in FIGS. 1 and 2 have been described in terms of providing left and right control signals, it is apparent that these signals may be used to provide an indication of movement along an axis having any orientation. Correspondingly, a second circuit similar to those in the two embodiments could be coupled to the joystick to provide an output signal indicating movement along a second axis of the joystick. For example, two circuits could be provided to indicate the movement of the joystick handle in an X-Y coordinate system.

I claim:

1. A control circuit comprising:

first and second dual input logic gates;

a first potentiometer having first and second end terminals and a wiper, the wiper being connected to one input of each of the first and second logic gates, the first end terminal being connected to the output of said first logic gate, the second end terminal being connected to the output of said second logic gate;

a capacitor coupling the wiper of said first potentiometer to a first electrical potential; and means operatively coupled to said wiper for selectively applying a second electrical potential to the other terminal of one of the first and second logic gates upon the wiper of the first potentiometer moving from a neutral position toward the first or second end terminals respectively;

whereby signals are produced at the outputs of said logic gates with the frequency of said signals varying in a continuous manner in correspondence with the movement of said wiper away from said neutral position.

2. The circuit as in claim 1 wherein said means for applying a second electrical potential comprises a single pole-triple throw switch in which the wiper of the switch is connected to the second potential, one switch end terminal is connected to the other input of the first logic gate and the other switch end terminal is connected to the other input of the second logic gate.

3. The circuit as in claim 1 wherein said means for applying a second electrical potential comprises:

a second potentiometer having first and second end terminals each being connected to the other input terminal of a different one of the first and second logic gates, and having a wiper connected to the second electrical potential, said wiper of the second potentiometer being mechanically connected to said wiper of the first potentiometer;

a first resistor coupling the other input of the first logic gate to said first electrical potential; and a second resistor coupling the other input of the second logic gate to said first electrical potential.

4. The circuit as in claim 3 herein said first and second resistors have means for varying their resistance.

5. The circuit as in claim 4 wherein said first and second logic gates comprise NAND gates.

* * * * *